(12) United States Patent
Tran et al.

(10) Patent No.: US 8,090,826 B2
(45) Date of Patent: *Jan. 3, 2012

(54) SCHEDULING DATA DELIVERY TO MANAGE DEVICE RESOURCES

(75) Inventors: Anh P. Tran, Seattle, WA (US); Lloyd Alfred Moore, Renton, WA (US); John Eldridge, Bellevue, WA (US); Steven Oliver Elliott, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 160 days.

This patent is subject to a terminal disclaimer.

(21) Appl. No.: 12/147,774

(22) Filed: Jun. 27, 2008

(65) Prior Publication Data

US 2009/0327491 A1 Dec. 31, 2009

(51) Int. Cl.
*G06F 15/173* (2006.01)

(52) U.S. Cl. ........ 709/225; 455/572; 455/573; 455/574; 713/320; 713/321; 713/322; 713/323; 713/324

(58) Field of Classification Search .... 455/343.1–343.6; 718/102, 107
See application file for complete search history.

(56) References Cited

U.S. PATENT DOCUMENTS

| | | |
|---|---|---|
| 5,369,798 A | 11/1994 | Lee |
| 5,867,657 A | 2/1999 | Bolosky et al. |
| 6,112,061 A | 8/2000 | Rapeli |
| 6,975,941 B1 | 12/2005 | Lau et al. |
| 7,099,689 B2 | 8/2006 | Bahl et al. |
| 7,130,313 B2 | 10/2006 | Pekonen |
| 7,139,813 B1 | 11/2006 | Wallenius |
| 7,142,855 B2 | 11/2006 | Bahl et al. |
| 7,155,487 B2 | 12/2006 | Yau et al. |
| 7,260,072 B2 | 8/2007 | Lee et al. |
| 7,286,845 B2 | 10/2007 | Boariu et al. |
| 7,299,304 B2 | 11/2007 | Saint-Hilaire et al. |
| 7,305,475 B2 | 12/2007 | Tock |
| 7,324,474 B2 | 1/2008 | Shirota et al. |
| 7,337,337 B2 | 2/2008 | Hong |
| 7,401,147 B2 | 7/2008 | Sikora et al. |
| 7,464,276 B2 | 12/2008 | Rusu et al. |
| 2002/0120696 A1 | 8/2002 | Mousseau et al. |
| 2003/0105809 A1 | 6/2003 | Yoshii et al. |
| 2003/0135643 A1* | 7/2003 | Chiu et al. ............. 709/238 |
| 2003/0149809 A1 | 8/2003 | Jensen et al. |

(Continued)

FOREIGN PATENT DOCUMENTS

EP 1715656 A1 10/2006

(Continued)

OTHER PUBLICATIONS

International Search Report and Written Opinion of International Application No. PCT/US2009/058166, dated Apr. 23, 2010, 10 pages.

(Continued)

*Primary Examiner* — Duyen Doan (57) ABSTRACT

Managing power-consuming resources on a first computing device by time-based and condition-based scheduling of data delivery from a plurality of second computing devices. A scheduler executing on the first computing device has knowledge of recurrent schedules for activation by the second computing devices. The first computing device determines availability of the power-consuming resources and adjusts an activation time for the schedules to use the power-consuming resources when the resources are available. Managing the schedules associated with the second computing devices preserves battery life of the first computing device.

18 Claims, 7 Drawing Sheets

U.S. PATENT DOCUMENTS

| | | | |
|---|---|---|---|
| 2004/0063442 A1 | 4/2004 | Goldberg | |
| 2004/0103411 A1 | 5/2004 | Thayer | |
| 2004/0196866 A1* | 10/2004 | Park et al. | 370/466 |
| 2004/0224674 A1 | 11/2004 | O'Farrell et al. | |
| 2004/0224694 A1 | 11/2004 | Zhao et al. | |
| 2004/0225525 A1 | 11/2004 | Weitzman | |
| 2005/0043020 A1 | 2/2005 | Lipsanen et al. | |
| 2005/0071419 A1 | 3/2005 | Lewontin | |
| 2005/0096102 A1 | 5/2005 | Mock et al. | |
| 2005/0108322 A1 | 5/2005 | Kline et al. | |
| 2006/0013235 A1 | 1/2006 | Farnham | |
| 2006/0068832 A1 | 3/2006 | Islam et al. | |
| 2006/0116146 A1 | 6/2006 | Herrod et al. | |
| 2006/0248197 A1 | 11/2006 | Evans et al. | |
| 2007/0011292 A1 | 1/2007 | Fritsch et al. | |
| 2007/0058605 A1 | 3/2007 | Meylan et al. | |
| 2007/0074217 A1 | 3/2007 | Rakvic et al. | |
| 2007/0097867 A1* | 5/2007 | Kneckt et al. | 370/236 |
| 2007/0149186 A1 | 6/2007 | Barbosa da Torre et al. | |
| 2007/0177558 A1 | 8/2007 | Ayachitula et al. | |
| 2007/0259699 A1 | 11/2007 | Homchaudhuri | |
| 2008/0025378 A1 | 1/2008 | Mahany et al. | |
| 2008/0113656 A1 | 5/2008 | Lee et al. | |
| 2008/0120409 A1 | 5/2008 | Sun et al. | |
| 2008/0126751 A1 | 5/2008 | Mizrachi et al. | |
| 2008/0130541 A1 | 6/2008 | Kokku et al. | |
| 2008/0144580 A1 | 6/2008 | Su et al. | |
| 2008/0176548 A1 | 7/2008 | Liang | |
| 2008/0215407 A1* | 9/2008 | Pachon et al. | 705/8 |
| 2009/0182608 A1 | 7/2009 | Tran et al. | |
| 2009/0182802 A1 | 7/2009 | Tran et al. | |
| 2009/0183157 A1* | 7/2009 | Tran et al. | 718/100 |
| 2009/0199192 A1 | 8/2009 | Laithwaite et al. | |
| 2009/0298535 A1 | 12/2009 | Klein et al. | |
| 2009/0307519 A1* | 12/2009 | Hyatt | 713/502 |
| 2009/0327390 A1 | 12/2009 | Tran et al. | |
| 2009/0327491 A1 | 12/2009 | Tran et al. | |
| 2010/0195584 A1 | 8/2010 | Wilhelmsson et al. | |

FOREIGN PATENT DOCUMENTS

| | | |
|---|---|---|
| WO | 2007007330 A1 | 1/2007 |

OTHER PUBLICATIONS

Kravets, et al., "Application Driven Power Management for Mobile Communication", Retrieved at << www-sal.cs.uiuc.edu/~rhk/pubs/winet98.ps >>, Wireless Networks, vol. 06, No. 4, Jul. 2000, pp. 1-20.

Pal, at el., "Improving Delivery Time Guarantees for Wireless Data Services", Retrieved at << http://ieeexplore.ieee.org/iel5/9178/29117/01311488.pdf?arnumber=1311488 >>, IEEE Wireless Communications and Networking Conference, WCNC, Mar. 21-25, 2004, pp. 2539-2544.

Zaharia, at el., "Fast and Optimal Scheduling over Multiple Network Interfaces", Retrieved at << http://www.acm.org/src/Matei/matei.html >>, 2007, pp. 16.

Pering, at el., "CoolSpots: Reducing the Power Consumption of Wireless Mobile Devices with Multiple Radio Interfaces", Retrieved at << https://www.usenix.org/events/mobisys06/full_papers/p220-pering.pdf >>, The 4th International Conference on Mobile Systems, Applications and Services, Jun. 19-22, 2006, pp. 220-232.

Flinn, Jason., "Managing Battery Lifetime with Energy-Aware Adaptation", Retrieved at << http://www.cs.cmu.edu/~satya/docdir/p137-flinn.pdf >>, ACM Transactions on Computer Systems, vol. 22, No. 2, May 2004, pp. 137-179.

Pering, at el., "Exploiting Radio Hierarchies for Power-Efficient Wireless Device Discovery and Connection Setup", Retrieved at << http://ieeexplore.ieee.org/iel5/9501/30140/01383368.pdf?tp=&isnumber=&arnumber=1383368 >>, 18th International Conference on VLSI Design held jointly with 4th International Conference on Embedded Systems Design (VLSID'05), India, Jan. 2007, pp. 6.

Valavanis, at al, "MobiShare: Sharing Context-Dependent Data & Services from Mobile Sources", Retrieved at <<http://ieeexplore.ieee.org/xpl/freeabs_all.jsp?arnumber=1241203>>, 2003, 8 pages.

Armstrong, et al, "Efficient and Transparent Dynamic Content Updates for Mobile Clients", Retrieved at <<http://www.usenix.org/events/mobisys06/full_papers/p56-armstrong.pdf>>, 2006, p. 56-68.

"ViaXML—Open XML Tools from Odyssey Software—Delivers Universal Secure Data Access, Mobile Device Management, Server Push with Action, Peer to Peer, and Notification", retrieved at <<http://www.mobic.com/oldnews/2000/11/viaxml.htm>>, 2000, 2 pages.

Final Office action mailed from the USPTO in U.S. Appl. No. 12/147,826, U.S., Sep. 1, 2010, pp. 13.

Non-final Office action mailed from the USPTO in U.S. Appl. No. 12/147,826, U.S., Mar. 10, 2010, pp. 10.

Shih, et al., "Wake on Wireless: An Event Driven Energy Saving Strategy for Battery Operated Devices", Retrieved at <<http://research.microsoft.com/users/bahl/Papers/Pdf/mobicom02.pdf, International Conference on Mobile Computing and Networking, Proceedings of the 8th annual international conference on Mobile computing and networking, Atlanta, Georgia, USA, Year of Publication: 2002, pp. 160-171.

Bahl, et al., "Reconsidering Wireless Systems with Multiple Radios", Retrieved at <<http://research.microsoft.com/users/bahl/Papers/Pdf/MultiRadio.pdf>>, ACM SIGCOMM Computer Communication Review, vol. 34 , Issue 5 (Oct. 2004), Session: Perspective Papers, Year of Publication: 2004, pp. 39-46.

Chlamtac, et al., "Energy Conservation in Access Protocols for Mobile Computing and Communication", Retrieved at <<http://www.jasonredi.com/papers/pdf/ChlamtacKrishnanEtAl_JournalOfMicro98_ECOverview.pdf>>, Microprocessors and Microsystems Journal (1998), pp. 1-11.

Rhee, et al., "Techniques for Minimizing Power Consumption in Low Data-Rate Wireless Sensor Networks", Retrieved at <<http://alumni.media.mit.edu/~deva/papers/wcnc.pdf>>, In Proc. IEEE Wireless Communications and Networking Conference (WCNC 2004), Mar. 2004, pp. 1-5.

"Pocket Power Manager 1.0", Retrieved at << http://www.filedudes.com/Pocket_Power_Manager-download-47203.html>>, Nov. 7, 2007, pp. 2.

"Non-final Office action mailed from the USPTO in U.S.", U.S. Appl. No. 12/147,774, U.S., May 14, 2010, pp. 11.

"Final Office action mailed from the USPTO in U.S.", U.S. Appl. No. 12/147,774, U.S., Oct. 15, 2010, pp. 12.

Jeffay, "Scheduling Sporadic Tasks with Shared Resources in Hard-Real-Time Systems", Proceedings of the 13th IEEE Real-Time Systems Symposium, Phoenix, AZ., Dec. 1992, pp. 89-99.

Bhulai, et al., "Scheduling Time-Constrained Jobs in the Presence of Background Traffic", Proceedings of the 39th IEEE. Conference on Decision and Control, vol. 2, Dec. 2000, pp. 1421-1426.

Jeffay, et al., "Rate-Based Resource Allocation Models for Embedded Systems", Lecture Notes in Computer 3 Science; vol. 2211, Proceedings of the First International Workshop on Embedded Software, Year of Publication: D 2001, pp. 204-222.

Yun, et al., "Event-Based Scheduling Algorithm for Rendering SMIL Documents", Fifth IEE International Conference on 3G Mobile Communication Technologies, 2004. 3G 2004, Publication Date: 2004, pp. 509-513.

Advisory Action mailed from the USPTO in U.S. Appl. No. 12/056,287, U.S., Dec. 30, 2010, pp. 2.

Cha, Bonnie, "Palm Announces Low-Cost Treo 680", Retrieved at <<http://reviews.cnet.com/4532-10921_7-0.html?author=5116399>>, Dated: Oct. 12, 2006, pp. 4.

"Symbian S60 Manual", RoadSync Using Exchange ActiveSync, DataViz, Inc, Retrieved on Jul. 29, 2008, pp. 1-33.

Final Office action mailed from the USPTO in U.S. Appl. No. 12/147,826, U.S., Mailed Aug. 8, 2011, pp. 11.

"Notice of Allowance", Dated: Apr. 1, 2011, U.S. Appl. No. 12/237,797, pp. 9. (MS# 324764.01).

"Non-final Office action", Dated: Feb. 18, 2011, U.S. Appl. No. 12/147,826, pp. 12. (MS# 323598.01).

"Advisory Action", Dated: Nov. 4, 2010, U.S. Appl. No. 12/147,826, pp. 3. (MS# 323598.01).

"Non-final Office action", Dated: Nov. 1, 2010, U.S. Appl. No. 12/237,797, pp. 5. (MS# 324764.01).

Blandford, Rafe, "Battle of the Pushers: The Search for the Ideal Push Email Solution", Date: Sep. 10, 2007.

Yin, et al., "Power-Aware Prefetch in Mobile Environments", Retrieved at <<http://ieeexplore.ieee.org/stamp/stamp.jsp?arnumber=01022307>>, Proceedings of the 22 nd International Conference on Distributed Computing Systems (ICDCS'02), IEEE, Vienna, Austria, Jul. 2-5, 2002, pp. 8.

Cao, et al., "Cache-Miss-Initiated Prefetch in Mobile Environments", Retrieved at <<http://ieeexplore.ieee.org/stamp/..2 stamp.jsp?arnumber=01263086>>, Proceedings of the 2004 IEEE International Conference on Mobile Data E. -I Management (MDM'04), IEEE, Berkeley, California, Jan. 19-Jan. 22, 2004, pp. 12.

Tuah, et al., "Resource-Aware Speculative Prefetching in Wireless Networks", Retrieved at <<http://portal.acm.org/citation.cfm?id=602413.602418>>, Wireless Networks 9, 2003, pp. 61-72.

* cited by examiner

SCHEDULING DATA DELIVERY TO MANAGE DEVICE RESOURCES

BACKGROUND

Mobile computing devices, such as mobile phones and personal digital assistants (PDA), have become increasingly popular in recent years. As the devices continue to get smaller, there are increasing limitations in resources such as memory, storage, bandwidth, and battery. Additionally, more applications now require increasing levels of such resources. For example, many applications execute recurring tasks such as synchronization with a server and real-time content updates that require frequent radio usage to persist connections. After the radio powers on to send data, the radio takes several seconds to power off (e.g., about 3 seconds on 2.5 G networks and about 20 seconds on 3 G networks). This radio "tail" absorbs power and diminishes device battery life. Further, there are other power inefficiencies in spinning up the radio and shutting down the radio.

Connected applications with real-time data push are being widely adopted by mobile users. The applications include electronic mail, personal information management, and other web applications. The servers pushing the data do not have enough device and network knowledge to preserve device battery life while providing a positive user experience.

SUMMARY

Embodiments of the invention enable a first computing device to manage the delivery of data to the first computing device from a plurality of second computing devices. The first computing device receives, from the second computing devices, data corresponding to one or more recurrent schedules. The schedules have defined activation times and tolerance factors. The first computing device determines availability of a communication interface on the first computing device, and matches the determined availability with each of the recurrent schedules. The first computing device adjusts the activation times for the schedules based on the matched availability, and provides the adjusted activation times to the second computing devices. At the adjusted activation times, the second computing devices activate the schedules to send data to the first computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
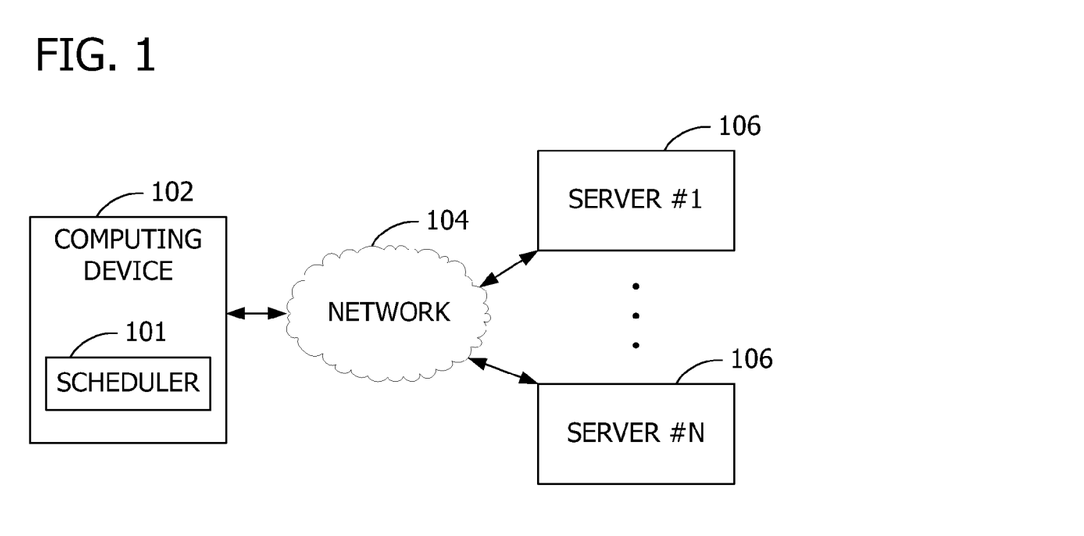
FIG. 1 is an exemplary block diagram of a computing device communicating with a plurality of servers.
Figure 2:
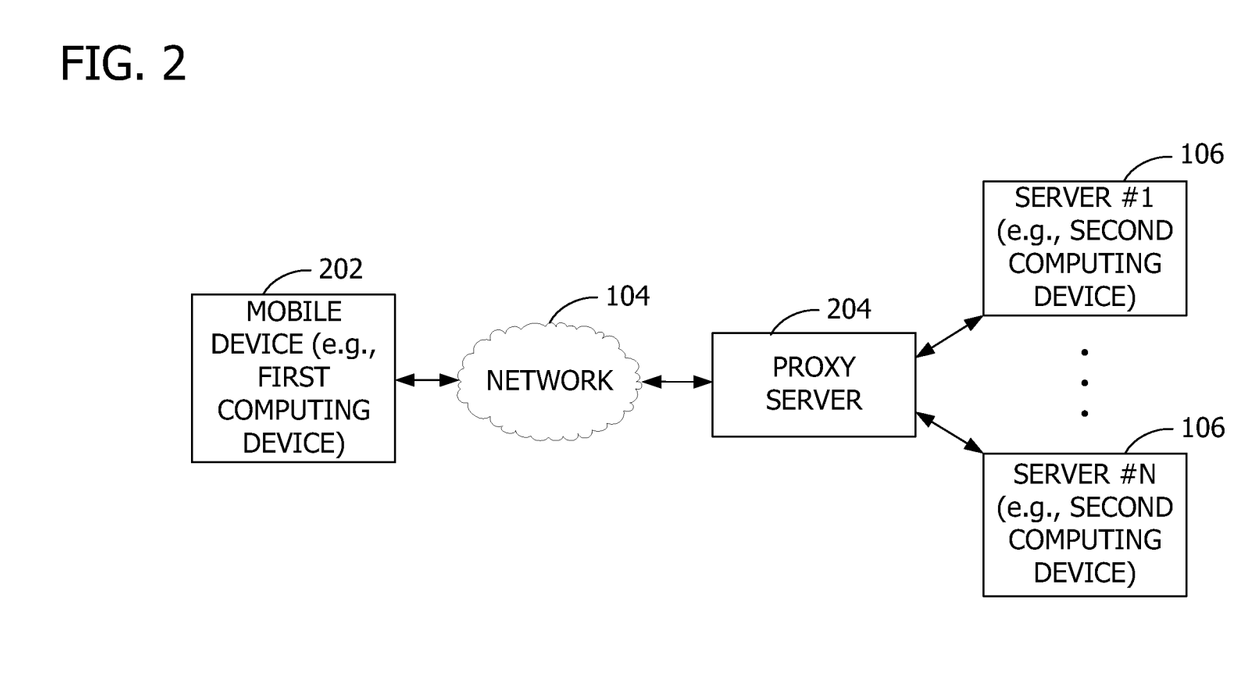
FIG. 2 is an exemplary block diagram illustrating a mobile device communicating with a plurality of servers through a proxy device.

Referring to the figures, embodiments of the invention provide a scheduler 101 executing on a computing device 102. The computing device 102 communicates via a network 104 with a plurality of servers 106 such as server #1 through server #N, where N is a positive integer. The servers 106 execute services to send data to the computing device 102 based on recurrent schedules 304 defined to occur periodically (e.g., regularly or intermittently). In some embodiments, the servers 106 execute or activate the schedules 304 to provide real-time content updates to the computing device 102. The servers 106 may also send heartbeat pings to keep open the connection between the servers 106 and computing device 102. Conversely the computing device 102 may also send the heartbeat pings, or any combination thereof. For example, some of the services push mail, calendar, contacts, and instant messaging data. Other services act as a gateway or proxy server 204 such as shown in FIG. 2 to enable the servers 106 (e.g., second computing devices) to keep a mobile device 202 (e.g., a first computing device) updated with content or connected to social networks.

While aspects of the invention are described and illustrated herein as being applicable to the servers 106 sending data to the computing device 102, the servers 106 may comprise other computing devices such as the proxy server 204, an enterprise server, or any other device sending data to the computing device 102. Further, while described in some embodiments with reference to the mobile device 202, aspects of the invention are operable with other devices such as laptop computers, hand-held navigation devices, or any other devices communicating with other devices. Additionally, while described in some embodiments with reference to the scheduler 101 or a scheduler service, aspects of the invention are applicable to any component, instructions, or logic performing the functionality illustrated and described herein.

Figure 3:
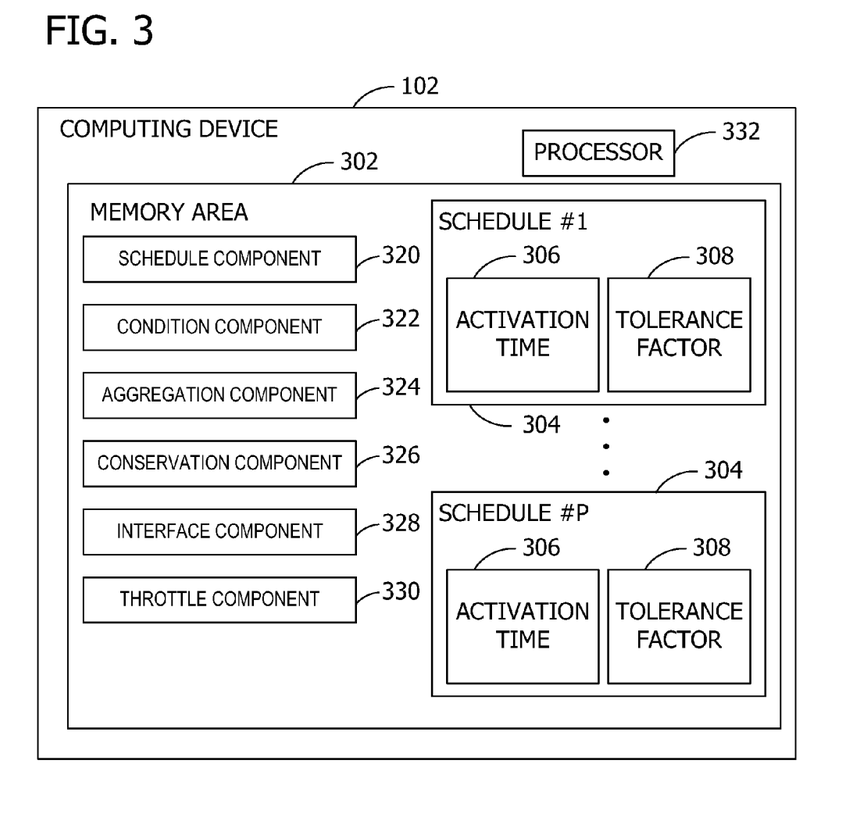
FIG. 3 is an exemplary block diagram illustrating a computing device having a memory area with computer-executable components and a plurality of schedules.

Referring next to FIG. 3, an exemplary block diagram illustrates the computing device 102 having a memory area 302. The memory area 302 stores computer-executable components and a plurality of the schedules 304 such as schedule #1 through schedule #P, where P is a positive integer. Some of the schedules 304 are associated with, provided by, and executed by the server 106 to transmit data to the computing device 102. For example, the computing device 102 receives the schedules 304 from the servers 106 via an interface component 328. Other schedules 304 are associated with one or more application programs executing on the computing device 102. Each of the schedules 304 has an activation time 306 and a tolerance factor 308 associated therewith, among other properties (e.g., rules for schedule expiration, maximum schedule run count, whether the schedule 304 requires use of any resource, etc.). One or more of the schedules 304 use a power-consuming resource associated with the computing device 102 during execution. The tolerance factor 308 generally indicates the tolerance of the schedule 304 to run early when the resource becomes available. The tolerance factor 308 includes any means for indicating the availability of the schedule 304 to execute at a time that differs from its defined activation time 306. For example, the tolerance factor 308 includes, but is not limited to, a constant value (e.g., in minutes or seconds), a percentage (e.g., a percentage of an interval duration such as 10%), and a rolling average of the minutes between resource availability.

Appendix A lists exemplary properties and definitions involved in defining the schedules 304.

Execution of the schedules 304 includes performing or executing one or more actions associated with the schedules 304 at the activation time 306 within the tolerance. In the example of FIG. 2, the scheduler 101 has knowledge of one or more future radio usage requests.

The computer-executable components operate to extend battery life of the computing device 102 by coalescing, combining, or otherwise aggregating the schedules 304 to optimize use of the available power-consuming resources on the computing device 102. The components are executed by a processor 332. In an embodiment, the processor 332 is transformed into a special purpose microprocessor by executing computer-executable instructions or by otherwise being programmed. Exemplary components include a schedule component 320, a condition component 322, an aggregation component 324, a conservation component 326, the interface component 328, and a throttle component 330. The schedule component 320 determines a time of availability of the power-consuming resource associated with the computing device 102. In some embodiments, the schedule component 320 determines the time of availability by searching the memory area 302 for schedules 304 that consume the resource. In embodiments in which the computing device 102 is the mobile device 202, the power-consuming resource includes one or more of the following: a radio frequency transmitter, a backlight, a processor, an audio amplifier, a global positioning system, a digital memory, a short-range wireless network adapter, an auxiliary processor, a vibration motor, a ringer, a camera, an accelerometer, and an ambient light sensor.

The condition component 322 identifies the schedules 304 stored in the memory area 302 that consume the resource during execution and are associated with the servers 106. Alternatively, the memory area 302 merely stores a requested execution time for the schedules 304 associated with the servers 106. The aggregation component 324 selects one or more of the identified plurality of the schedules 304 for which a difference between the recurrent activation time 306 and the time of availability determined by the schedule component 320 is within the tolerance factor 308. The conservation component 326 adjusts the recurrent activation time 306 for the schedules 304 selected by the aggregation component 324 as a function of the time of availability determined by the schedule component 320. In some embodiments, the conservation component 326 accounts for network latencies and/or processing delays of the servers 106 when adjusting the activation time 306. For example, the adjusted activation time 306 may actually be a time slightly before the resource becomes available on the computing device 102. The condition component 322 may also decide not to adjust activation times 306 based on observed network conditions, measurement of actual radio usage, environmental conditions, or other conditions if it is determined that adjustment of the schedules 304 in such network conditions would increase resource consumption.

The interface component 328 sends to the servers 106 the adjusted, recurrent activation time 306 for the schedules 304 selected by the aggregation component 324. For example, the interface component 328 broadcasts the adjusted, recurrent activation time 306 to the servers 106. In some embodiments, the adjusted activation time 306 is provided as an offset from a current time (e.g., a number of minutes from the current time).

The servers 106 then execute the schedules 304 selected by the aggregation component 324 at the adjusted, recurrent activation time 306 to use the power-consuming resource while the resource is available.

The throttle component 330 limits a quantity of the schedules 304 selected by the aggregation component 324 as a function of a predefined limit value or throttle value. The limit or throttle value is defined, in some embodiments, as a function of a consumption state of the communication interface on the computing device 102. In this manner, the throttle component 330 prevents the computing device 102 from receiving large amounts of data at each of the adjusted, recurrent activation times 306 which may cause acute resource starvation. In some embodiments, each time one of the schedules 304 is selected, a counter increments. If the counter value reaches the throttle limit, further selections are prevented. The throttle limit may also be modified based on measurements of existing network conditions.

Appendix B includes a list of exemplary properties and states for the scheduler 101.

Figure 4:
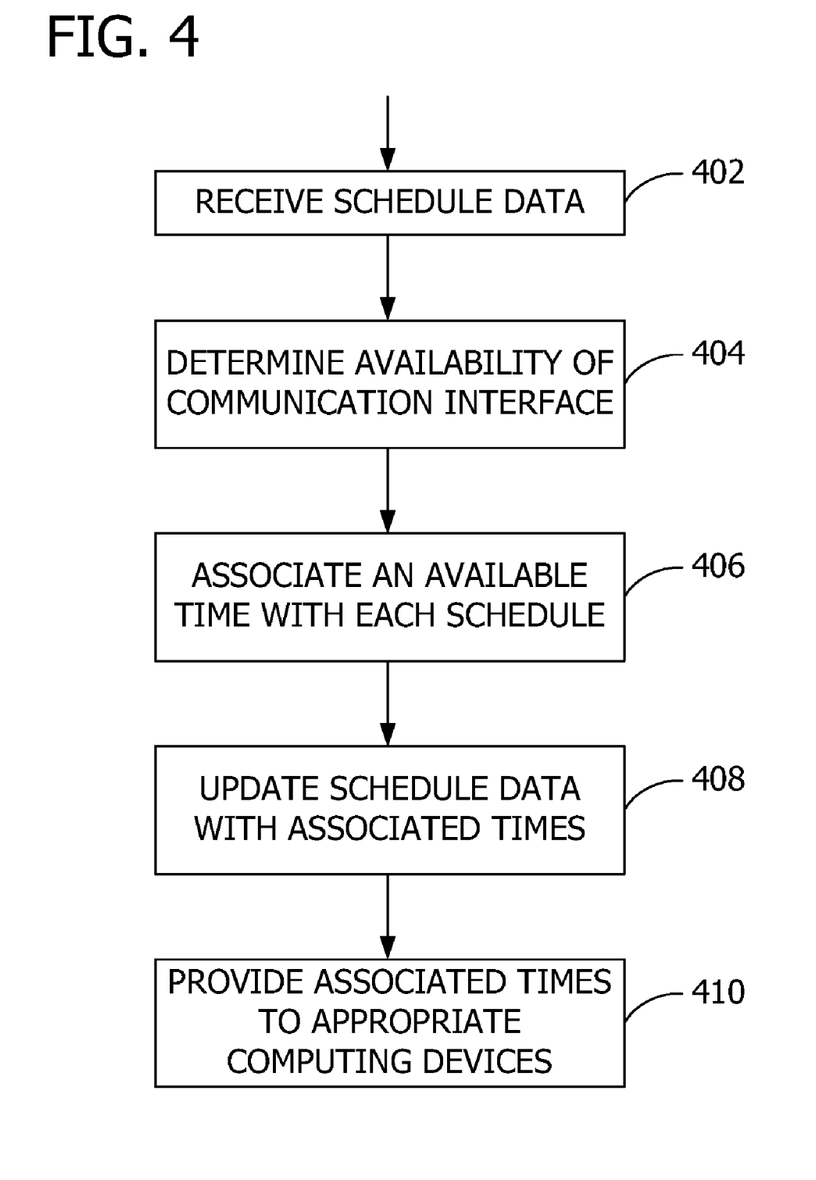
FIG. 4 is an exemplary flow chart illustrating time-based adjustment of server schedules.

Referring next to FIG. 4, an exemplary flow chart illustrates time-based adjustment of server schedules 304. At 402, the computing device 102 (e.g., a first computing device) receives data corresponding to one or more of the recurrent schedules 304 associated with the servers 106 (e.g., second computing devices). The data indicates, for example, the defined activation time 306 and the tolerance factor 308 for each of the recurrent schedules 304. Alternatively or in addition, the data indicates a time interval and connection information. In embodiments in which the server 106 does not know when data will be sent to the computing device 102, the server 106 sends the data after receiving a notification from the computing device 102 to send the data (e.g., see FIG. 5). Activation of the recurrent schedules 304 by the servers 106 causes data to be transferred from the servers 106 to a communication interface associated with the computing device 102. In embodiments in which the computing device 102 is the mobile device 202, the communication interface includes a radio. At 404, the availability of the communication interface is determined. At 406, each of the schedules 304 is associated with one of the available times of the communication interface based on the availability and the tolerance factor 308. For example, the available times are compared or matched to the activation times 306 for each of the schedules 304 such that a difference between the activation time 306 of each of the schedules 304 and the associated available time is within the tolerance factor 308 for the schedules 304.

In another example, the differences between the available times and the activation time 306 for each of the schedules 304 are calculated and compared to the corresponding tolerance factor 308. The available times are selected for each of the schedules 304 in instances in which the difference is within the tolerance factor 308.

In embodiments in which the schedules 304 are assigned a priority value (e.g., by an application program or service), the association at 406 occurs as a function of the assigned priority value. For example, a financial schedule for sending stock data may have a higher priority than an entertainment schedule for sending movie reviews. The scheduler 101 uses the priority value to ensure that the news schedule receives the earliest available time.

At 408, the schedules 304 are updated with the association between the schedules 304 and the available times. At 410, the servers 106 are provided with the updated activation times 306 for the schedules 304. The servers 106 subsequently activate the schedules 304 at the associated times to use the communication interface when the communication interface is available on the computing device 102. In some embodiments, the computing device 102 or the servers 106 define a next activation time 306 for each of the activated schedules 304 based on an interval duration for the schedule 304. For example, the interval duration for each of the schedules 304 is added to a current time of activation to define the next activation time 306 for each of the schedules 304. In some embodiments, a difference between the current time and the defined next activation time 306 is less than the interval duration (e.g., based on the determined availability of the resource). In other embodiments, the difference is greater than the interval duration.

The interval duration is set by the servers 106 when creating the schedules 304 in some embodiments of the invention. The actual periods between schedule executions may be either shorter or longer than the interval duration but the long-term average interval duration converges to the specified interval. In an embodiment, the servers 106 creating the schedules 304 determine which method of setting the next activation time 306 should be used. Successive interval durations may be the same, or be related linearly, exponentially, or the like. For example, some of the schedules 304 have progressively increasing intervals between activations. In an embodiment, the servers 106 specify one or more of an initial interval value, a type of progression (e.g., linear or exponential), and a maximum interval value. When the schedules 304 execute, the interval starts from the initial value and then increases appropriately after each execution. If the maximum interval value is specified, the interval duration never increases above the maximum interval value but remains at its highest value.

Figure 5:
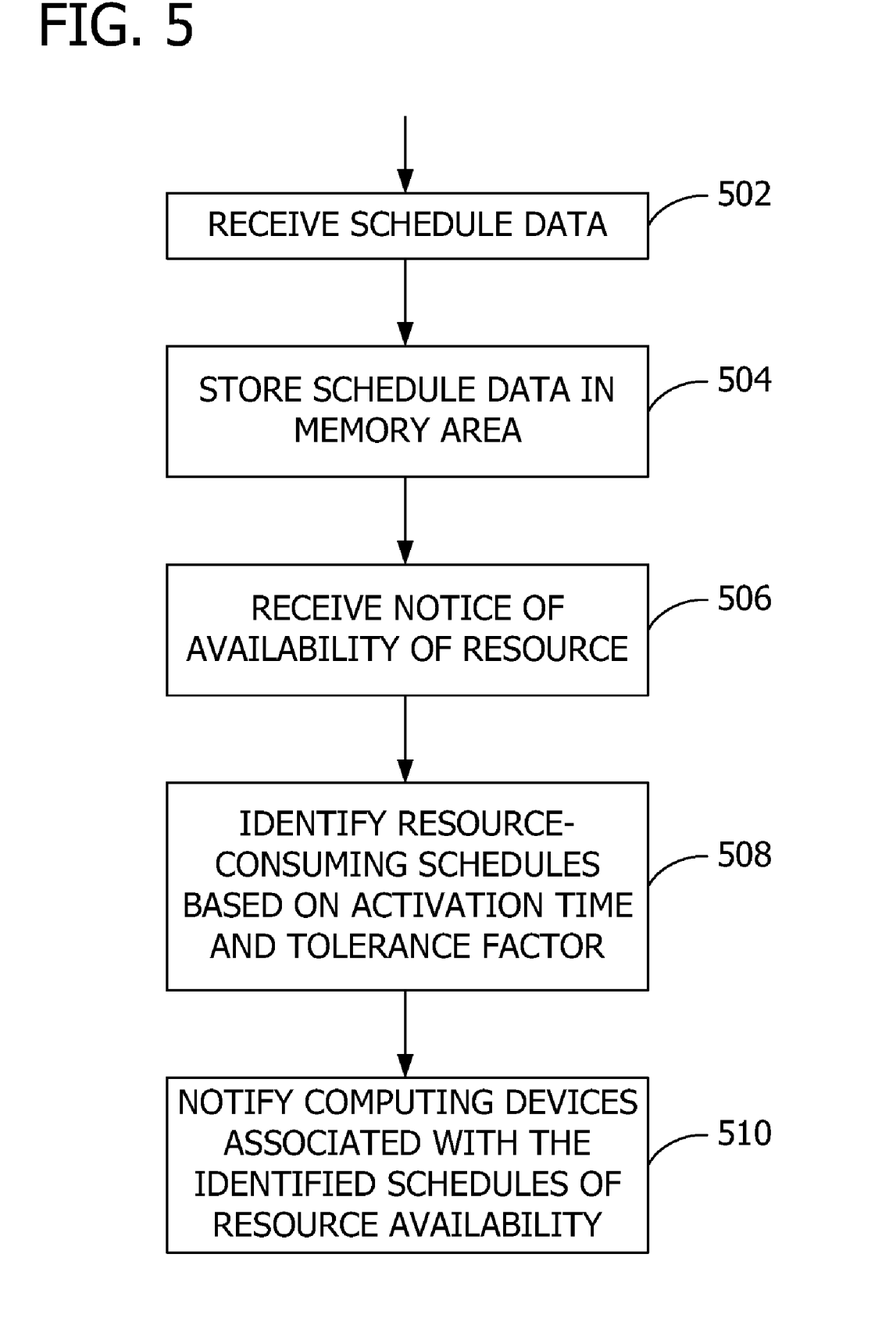
FIG. 5 is an exemplary flow chart illustrating condition-based adjustment of server schedules.

Referring next to FIG. 5, an exemplary flow chart illustrates condition-based adjustment of server schedules 304. At 502, schedule data including the activation time 306 and tolerance factor 308 for one or more of the schedules 304 associated with the servers 106 is received by the computing device 102. The received schedule data is stored at 504 in the memory area 302. At 506, the computing device 102 receives, at a notification time, notification of availability of a power-consuming resource on the computing device 102. The notification includes an event notification that the power-consuming or power-constrained resource, or other resource, is available. For example, the event includes any condition such as a particular time or a device condition.

In embodiments in which the computing device 102 is the mobile device 202, there are several ways to receive notification that a cellular radio is transmitting data on the mobile device 202. One way involves the radio manufacturer informing the software layer above the radio that the radio is transmitting data. Another way is to monitor the internet protocol (IP) stack for data that is sent or received. Yet another way is to monitor data exchanges and then determine the connection details (e.g., adapter name) associated with each of the data exchanges. When data is transmitted or received, the time is recorded and an event state is set (e.g., to "true"). After a defined time period (e.g., ten seconds), the event state is reset (e.g., to "false") if no other data has been transmitted. The scheduler 101 performs the operations described herein to coalesces the schedules 304 upon detecting that the state of the event goes from "false" to "true" in this example (e.g., indicating that the radio is transmitting data).

At 508, the computing device 102 identifies one or more of the schedules 304 that use the resource and for which a difference between the activation time 306 and the notification time is within the tolerance factor 308 for the schedule 304. For example, the one or more schedules 304 are identified as a function of the event notification, a current time, the defined activation time 306, and the tolerance factor 308 of each of the schedules 304. For example, the scheduler 101 identifies the schedules 304 for which the event is a defined condition for activation of the schedules 304, or otherwise identifies the schedules 304 to which the event applies. The scheduler 101 further selects, from the identified schedules 304, those schedules 304 that may be activated early based on the tolerance factor 308 for each of the schedules 304. For example, the scheduler 101 calculates a difference between the current time and the defined activation time 306 for each of the schedules 304 and compares the calculated difference to the tolerance factor 308 for the schedules 304. For all differences that are within tolerance, the corresponding schedules 304 are selected for activation.

At 510, the computing device 102 notifies the servers 106 corresponding to the identified schedules 304 of the availability of the resource. The servers 106 execute or activate the identified schedules 304 to send data to the computing device 102. By varying the activation time 306 of each schedule 304 within the tolerance, the scheduler 101 operates to extend battery life by taking advantage of resources while the resources are available and by minimizing overhead. For example, when there is an asynchronous cellular, wireless-fidelity (Wi-Fi), or other radio transmitter or receiver event (e.g., the server 106 sends the computing device 102 data or the user initiates a web browsing session), the scheduler 101 scans a database and determines schedules 304 that can piggyback or leverage the radio usage. Aggregating schedules 304 in this manner minimizes radio spin ups. In other embodiments, the scheduler 101 operates to minimize the frequency of bringing the device out of an idle state.

Figure 6:
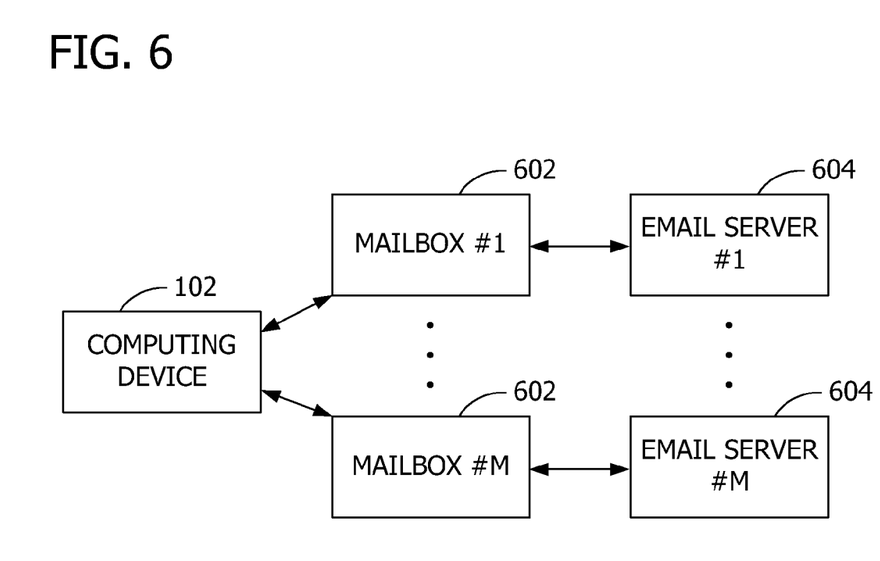
FIG. 6 is an exemplary block diagram illustrating a computing device communicating with a plurality of electronic mailboxes populated by email servers.

Referring next to FIG. 6, an exemplary block diagram illustrates the computing device 102 communicating with a plurality of mailboxes 602 populated by email servers 604. In this embodiment, the mailboxes 602 include mailbox #1 through mailbox #M, where M is a positive integer. Each of the mailboxes 602 receives electronic mail from the corresponding email server 604 such as email server #1 through email server #M, where M is a positive integer.

Figure 7:
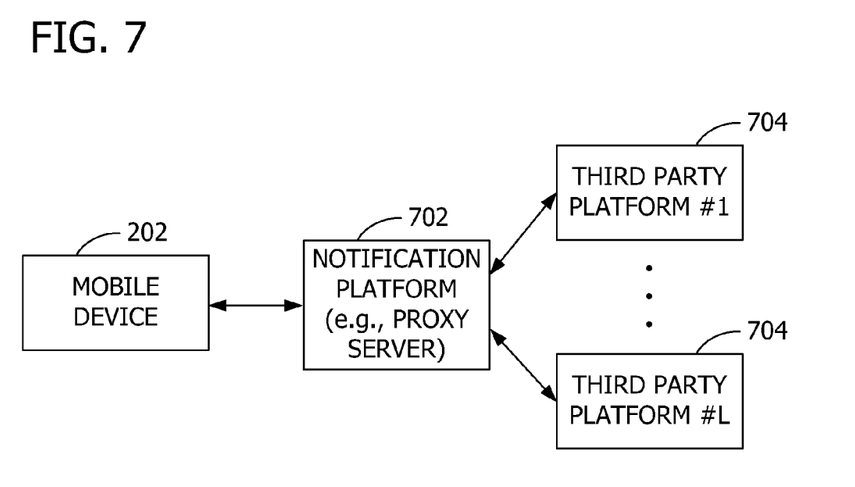
FIG. 7 is an exemplary block diagram illustrating a mobile device communicating with a notification platform receiving notifications from a plurality of third party platforms.

Referring next to FIG. 7, an exemplary block diagram illustrates the mobile device 202 communicating with a notification platform 702 receiving notifications from a plurality of third party platforms 704. In the example of FIG. 7, the plurality of third party platforms 704 includes third party platform #1 through third party platform #L, where L is a positive integer. The notification platform 702 acts as the proxy server 204. In the embodiment of FIG. 7, the notification platform 702 receives notifications from the third party platforms 704 that a user account associated with the mobile device 202 has data updates. These notifications have an assigned priority. For example, notifications with a priority of P1 are for immediate delivery, notifications with a priority of P2 are able to wait for a defined amount of time, etc. The notification platform 702 stores the notifications and sends the appropriate notifications at the activation time 306 specified by the scheduler 101 executing on the mobile device 202.

For example, the scheduler 101 has schedules 304 for two services to send heartbeats. The first service is scheduled to send at T=0, T=15, T=30, etc. The second service is scheduled to send heartbeats at T=10, T=20, T=30, etc. These schedules 304 are provided to the mobile device 202. The scheduler 101 executing on the mobile device 202 sees that there is a scheduled radio spin up at T=10 for the first service and that the schedule 304 at T=10 has a tolerance factor 308 to run early of 20%. This means that if there is a radio event that occurs anytime from T=8 to T=10, the schedule 304 will run early to leverage that radio event. The scheduler 101 instructs the notification platform 702 to hold any data to be sent to the device at T=9.

Exemplary Operating Environment

A computer or computing device 102 such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for identifying one or more of the recurrent schedules 304 that use a resource and for which a difference between the defined activation time 306 and the notification time is within the tolerance factor 308, and exemplary means for managing the recurrent schedules 304 associated with the second computing devices to use the resource on the first computing device when the resource is available. In some embodiments, the environment is dynamic and the schedules 304 are updated at each radio spin up.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below in Table A1 are exemplary properties and definitions involved in defining a recurrent schedule.

TABLE A1

Exemplary Properties for Recurrent Schedule.

| Properties | Definition |
|---|---|
| AbsoluteStartTime | The time in UTC the schedule begins. If absent at schedule creation, the system assigns the "T = 0" starttime, a system time that is in the past, designed to align all schedules to the same start time. The schedule executes at the aligned interval, not to exceed the interval duration. If the application specified an absolute start time that occurs in the past, and the application specifies that |

TABLE A1-continued

Exemplary Properties for Recurrent Schedule.

| Properties | Definition |
| --- | --- |
| | IntervalDurationDrift = True, then the behavior is the same as if AbsoluteStartTime was absent (align to the system assigned T = 0). Else the schedules align to the AbsoluteStartTime provided. If the absolute start time is greater than the current time, than the first scheduled time will be the absolute start time. If an absolute start time is provided, it will not be reset after the device loses power. For example, if the application specifies 5pm UTC as the start time, with a 24 hour duration, the schedule will always attempt to execute at 5pm UTC daily. All schedules persist across reboot because the schedules are saved into a persistent store. |
| RelativeStartTime | The number of minutes relative to the time of provisioning when the schedule should begin. RelativeStartTime has more meaning for remotely managed operations, where the server doesn't know what time it is on the device (the user may have change the time due to time zone) and the server would like to configure the schedule to start x minutes after the remote command is received by the device. Upon provisioning, the scheduler code dynamically creates or overwrites the AbsoluteStart time if it exists, setting it to the current time plus this value. If both AbsoluteTime and RelativeTime are provided, then the last value received via the remote command is the one the scheduler respects. The RelativeStartTime is stored as minutes and if queried, the result will be the number of minutes. |
| ScheduleRunCount | This is the number of times the actions are scheduled to execute, not to exceed the end date and time, if the end date is specified. If this field is not present and the end date present, the schedule runs until the end date. If this field is zero, the schedule runs infinitely. |
| ActualRunCount | This is the number of times the scheduler has executed the schedule. |
| AbsoluteEnd | The time in UTC the schedule ends. If absent, the schedule never ends unless there is a RelativeEnd. If both AbsoluteEnd and RelativeEnd are provided, then the last value received from the remote management server is the one the Scheduler respects. |
| RelativeEnd | The number of minutes relative to the time of provisioning the schedule should end. Upon provisioning, the scheduler code dynamically creates or overwrites the AbsoluteEnd time if it exists, setting it to the current time plus this value. If both AbsoluteEnd and RelativeEnd are provided, then the last value received is the one the Scheduler respects. The RelativeEnd is stored as minutes and if queried, the result will be the number of minutes. |
| IntervalDuration | This is the base number of minutes between schedule events. If zero, then the schedule will return an error since the schedule is infinite. |
| LinearBackoff | LinearBackoff is a type of schedule that applications may want to use when it is in retry mode. LinearBackoff takes the IntervalDuration and calculates the time between schedules as: X, 2X, 3X, 4X and ending when the AbsoluteEnd is reached or ScheduleRunCount is reached, whichever occurs first. |
| ExponentialBackoff | ExponentialBackoff is a type of schedule that applications may want to use when it is in retry mode. ExponentialBackoff takes the IntervalDuration and calculates the time between schedule events as: X, 2X, 4X, 8X, 16X, 32X and ending when the AbsoluteEnd is reached or ScheduleRunCount is reached, whichever occurs first. |
| Action | The application can specify an action to execute at the scheduled time. Exemplary actions supported are: launch an EXE or create a named event. A schedule can exist without an action —it would be a schedule to do nothing, which is relevant, for example: when the radio roams, do nothing. |
| RequiresNetwork | This property indicates whether the application needs a network connection for their scheduled actions. |
| DeleteWhenExpired | The application can specify that the schedule is deleted when expired. When set to true, the Schedule is deleted when the ActualRunCount is equal to the |

TABLE A1-continued

Exemplary Properties for Recurrent Schedule.

| Properties | Definition |
|---|---|
| | ScheduleRunCount. When the schedule end date occurs, there is a possibility that the user or the system has changed the device clock. |
| Condition | A recurrence schedule can be activated based on an occurrence of an event or events. For example: activate this schedule when the device is cradled and desktop pass-through is available. When null, ConditionPriority is not required.<br>Note: the events in the state and notification broker are limitless, applications can create and maintain any types of events that other applications are interested in. |
| ConditionPriority | This tells the Scheduler the order to check conditions that activate a schedule. Multiple conditions can be true at the same time, so this order is necessary. A ConditionPriority is required when a condition has been set. Assigning the same priority to multiple schedules in the same group will result in an error. |
| GroupID | An ID that represents a grouping of the schedules that have conditions that will be checked in the order specified by ConditionPriority. Within the GroupID, each priority assignment must be unique. |
| SpecifyRunEarlyTime | If False, application does not want to specify the RunEarlyTime. Use the number of minutes equal to 10% of the interval duration as the "run early tolerance" in this case.<br>If True, the application wants to specify the RunEarlyTime. |
| RunEarlyTime | If SpecifyRunEarlyTime is True, this value is the percentage of the IntervalDuration that the application is willing to be executed earlier than scheduled, in order to help the device preserve battery by piggybacking on an available connection. |
| IntervalDurationDrift | If False, the IntervalDuration is an average value. This means if the scheduled time executes early due to aggregation, the next scheduled time is not adjusted to ensure that the IntervalDuration is X. For example, a service has a schedule to run every 1 hr, the scheduled time is noon and 1pm. At 11:55pm, there is an existing data connection and the service has a RunEarlyTime that allows it to be scheduled early, to piggy-back on the 11:55pm connection event. The next scheduled time remains at 1pm.<br>If True, the IntervalDuration is the maximum amount of time between scheduled events. This means that the next scheduled time is equal to the last scheduled time + the IntervalDuration. |

APPENDIX B

Listed below are exemplary properties and states for a scheduler according to embodiments of the invention.

TABLE B1

Global State.

| Name | Description |
|---|---|
| CURRENT_TIME | represents the value of the system clock in UTC |
| SERVICE_START_TIME | represents the value of the system clock in UTC, when the Service Started |
| SERVICE_START_TICK | represents the value of the Tick count when the service started |
| SCHEDULES | List of all schedules in the system. |
| AGGREGATION_ENABLED | Enable or disable the aggregation function |

TABLE B2

State per Schedule.

| Name | Description |
|---|---|
| CURRENT_INTERVAL | Defines the interval which is used to compute NEXT_RUN_TIME. This gets reset to initial value upon service start or when the schedule becomes active. |
| CURRENT_RUN_COUNT | Count which keeps track of number of times the schedule has fired. |
| NEXT_RUN_TIME | Time at which the next scheduled firing is supposed to happen. −1 if the schedule was never scheduled to fire. |
| ENABLED | If enabled, the schedule could be eligible to be active. |

TABLE B3

State per Group.

| Name | Description |
|---|---|
| GROUP_LAST_ACTUAL_RUN_TIME | Time at which last firing of a schedule among its schedules occurred. −1 If no |

TABLE B3-continued

State per Group.

| Name | Description |
|---|---|
| GROUP_LAST_SCHEDULED_RUN_TIME | schedule fired in this group then. Most recent time at which a schedule among its schedules was scheduled to |
| ACTIVE_SCHEDULE | fire. −1, if no schedule was scheduled earlier. Is the active schedule in the group |

TABLE B4

Global Properties.

| Name | Description |
|---|---|
| FUZZ_THROTTLING_LIMIT | For every adjustable event, this is the maximum number of schedules which can be aggregated together. This is used for Throttling. |
| STARTUP_THROTTLING_LIMIT | Upon service startup, if there are multiple schedules which need execution, then this setting is used to throttle their execution, by batching those schedules with this limit. Each Batch's execution is delayed by the STARTUP_THROTTLING_DELAY factor. |
| STARTUP_THROTTLING_DELAY | If there are more than STARTUP_THROTTLING_LIMIT schedules which need to get run at startup, the schedules are batched and each batch is delayed by this delay. |

TABLE B5

Schedule Properties.

| Name | Default Value | Description |
|---|---|---|
| ID | N/A | Uniquely identifies the schedule in the system |
| GROUP_ID | N/A | Identifies the group, the schedule is part of. |
| START_TIME | 0 (no start time) | Absolute time when the scheduler timeline starts. Schedule guarantees that the associated actions will not be triggered before start time. Start time is optional. |
| RELATIVE_START_TIME | 0 (no relative start time) | The time delay from the schedule creation time at which the schedule could become active. |
| END_TIME | −1 (no end time) | Absolute time when the scheduler timeline ends. Schedule guarantees that the associated actions will not be triggered after end time. End time is optional |
| MAX_RUN_COUNT | −1 (infinite) | Maximum number of times a schedule can fire. |
| DELETE_WHEN_EXPIRED | FALSE | Specifies if the schedule must be deleted after it expires |
| USES_NETWORKING | FALSE | Specifies if the actions associated with the schedule use networking. This is used for aligning the schedules to conserve battery power. |
| RID | Null | Identifies the radio id, if the actions use networking. |

TABLE B5-continued

Schedule Properties.

| Name | Default Value | Description |
| --- | --- | --- |
| EARLY_RUN_TIME | 0 [Aggregation disabled] | Defines the amount of time the schedule run can be advanced from its schedule run. |
| CONDITIONS | NULL | Set of conditions which must be true, for the schedule to be active. |
| ACTIONS | N/A | Set of actions which are triggered for schedule when schedule executes |

What is claimed is:

1. One or more computer-readable storage media embodying computer-executable components for conserving power in a mobile device, the computer-readable storage media not being propagating signals, said components comprising:
    a schedule component for determining a future time of availability of a power-consuming resource, said power-consuming resource being associated with the mobile device;
    a condition component for identifying a plurality of schedules stored in a memory area that consume the resource during execution, said plurality of schedules being associated with one or more computing devices, said computing devices being connected to the mobile device via a network, each of said plurality of schedules having a recurrent activation time and a tolerance factor and, upon execution by the computing devices, causing data to be transmitted from the computing devices to the mobile device;
    an aggregation component for selecting one or more of the identified plurality of schedules for which a difference between the recurrent activation time and the future time of availability determined by the schedule component is within the tolerance factor;
    a conservation component for adjusting the recurrent activation time for the schedules selected by the aggregation component as a function of the future time of availability determined by the schedule component; and
    an interface component for sending to the computing devices the adjusted, recurrent activation time for the schedules selected by the aggregation component, wherein the computing devices execute the schedules selected by the aggregation component at the adjusted, recurrent activation time to use the power-consuming resource of the mobile device while the resource is available.

2. The computer-readable storage media of claim 1, the computer-readable storage media not being propagating signals, wherein the schedule component determines the future time of availability by searching the memory area for schedules that consume the resource.

3. The computer-readable storage memory of claim 1, the computer-readable storage media not being propagating signals, wherein the interface component receives the identified plurality of schedules from the computing devices.

4. The computer-readable storage media of claim 1, the computer-readable storage media not being propagating signals, wherein the schedule component determines a future time of availability of a radio frequency transmitter associated with the mobile device.

5. The computer-readable storage media of claim 1, the computer-readable storage media not being propagating signals, further comprising a throttle component for limiting a quantity of schedules selected by the aggregation component as a function of a predefined limit value to prevent the mobile device from receiving an amount of data exceeding a predefined threshold during the adjusted, recurrent activation time.

6. The computer-readable storage media of claim 1, the computer-readable storage media not being propagating signals, wherein the power-consuming resource comprises one or more of the following associated with a mobile device: a backlight, a processor, an audio amplifier, a global positioning system, a digital memory, a short-range wireless network adapter, an auxiliary processor, a vibration motor, a ringer, a camera, an accelerometer, and an ambient light sensor.

7. A method comprising:
    receiving, by a first computing device from a second computing device, data corresponding to one or more recurrent schedules associated with the second computing device, said data indicating a defined activation time and a tolerance factor for each of the recurrent schedules, wherein activation of the recurrent schedules by the second computing device causes data to be transferred from the second computing device to a communication interface associated with the first computing device;
    determining one or more future times during which the communication interface associated with the first computing device will be available;
    associating the determined future times of availability of the communication interface with the recurrent schedules of the second computing device as a function of the defined activation time and the tolerance factor, wherein associating comprises matching at least one of the recurrent schedules to at least one of the determined future times of availability of the communication interface such that a difference between the activation time of said at least one of the recurrent schedules and said determined one or more future times of availability of the communication interface is within the tolerance factor, wherein associating further comprises adjusting the activation time of said at least one of the recurrent schedules as a function of said determined one or more future times of availability of the communication interface; and
    providing the adjusted activation time of said at least one of the recurrent schedules to the second computing device, wherein the second computing device activates said at least one of the recurrent schedules at the adjusted activation time to use the communication interface on the first computing device when the communication interface is available.

8. The method of claim 7, wherein receiving the data comprises receiving priority values corresponding to the recurrent schedules, and wherein associating the determined future times of availability of the communication interface with the recurrent schedules comprises associating the determined future times of availability of the communication interface with the recurrent schedules as a function of the received priority values.

9. The method of claim 7, wherein each of the recurrent schedules has an interval duration between activation times, and further comprising defining a next activation time for each of the activated schedules based on the interval duration for the schedule.

10. The method of claim 9, wherein defining the next activation time comprises adding the interval duration for each of the schedules to a current time to define the next activation time for each of the schedules.

11. The method of claim 9, wherein a difference between a current time and the defined next activation time is less than the interval duration.

12. The method of claim 7, wherein associating the determined future times of availability of the communication interface with the recurrent schedules comprises:
calculating differences between the determined future times of availability of the communication interface and the defined activation time for each of the schedules;
comparing the calculated differences to the tolerance factor for the schedules; and
selecting one of the determined future times of availability of the communication interface based on said comparing.

13. The method of claim 7, wherein said receiving, said determining, said associating, and said providing are performed by a mobile device.

14. The method of claim 7, further comprising defining a throttling limit, and wherein associating the determined future times of availability of the communication interface with the recurrent schedules comprises associating the determined future times of availability of the communication interface with a quantity of the recurrent schedules that is less than the defined throttling limit.

15. The method of claim 14, wherein defining the throttling limit comprises defining the throttling limit as a function of a consumption state of the communication interface on the mobile device.

16. A system associated with a first computing device, said system comprising:
a memory area for storing an activation time and a tolerance factor for each of a plurality of recurrent schedules, said plurality of recurrent schedules being associated with a plurality of second computing devices; and
a processor configured to execute computer-executable instructions for:
receiving, from the second computing devices, the defined activation time and tolerance factor for each of the recurrent schedules;
storing the received activation time and tolerance factor for each of the recurrent schedules in the memory area;
receiving notification of a future time of availability of a resource, said resource being associated with the first computing device;
identifying one or more of the recurrent schedules that use the resource and for which a difference between the defined activation time and the future time of availability is within the tolerance factor, said identified recurrent schedules for execution by the second computing devices;
adjusting the defined activation times of at least one of the identified recurrent schedules as a function of the future time of availability of the resource; and
notifying the second computing devices corresponding to the identified recurrent schedules of the adjusted, defined activation times, wherein the corresponding second computing devices execute the identified recurrent schedules at the adjusted, defined activation times to use the resource on the first computing device during the future time of availability of the resource.

17. The system of claim 16, wherein the resource comprises a communication interface associated with the first computing device.

18. The system of claim 16, further comprising:
means for identifying the one or more of the recurrent schedules that use the resource and for which a difference between the defined activation time and the future time of availability is within the tolerance factor; and
means for managing the recurrent schedules associated with the second computing devices to use the resource on the first computing device during the future time of availability of the resource.

* * * * *